United States Patent [19]
Leonard et al.

[11] Patent Number: 5,482,534
[45] Date of Patent: Jan. 9, 1996

[54] EXTRACTION OR RECOVERY OF NON-FERROUS METAL VALUES FROM ARSENIC-CONTAINING MATERIALS

[75] Inventors: Rodney L. Leonard, Wembley Downes, Australia; John G. Whellock, Denver, Colo.

[73] Assignee: Sasox Processing Pty. Limited, Australia

[21] Appl. No.: 211,916

[22] Filed: Apr. 20, 1994

[30] Foreign Application Priority Data

Oct. 25, 1991 [AU] Australia .................... PK9105

[51] Int. Cl.$^6$ .................................................. C22B 3/44
[52] U.S. Cl. ................... 75/743; 75/744; 423/87
[58] Field of Search ................. 75/733, 743, 744; 423/87

[56] References Cited

U.S. PATENT DOCUMENTS

| | | | |
|---|---|---|---|
| 3,986,866 | 10/1976 | Coffer | 75/733 |
| 4,241,039 | 12/1980 | Koh et al. | 423/87 |
| 4,244,734 | 1/1981 | Reynolds et al. | 75/733 |
| 4,244,735 | 1/1981 | Reynolds et al. | 75/733 |
| 4,331,469 | 5/1982 | Kunda | 75/733 |
| 5,344,479 | 9/1994 | Kerfoot et al. | 75/743 |

FOREIGN PATENT DOCUMENTS

| | | |
|---|---|---|
| 23515/84 | 1/1984 | Australia . |
| 50595/90 | 2/1990 | Australia . |
| 0155250 | 9/1985 | European Pat. Off. . |
| 0272060 | 6/1988 | European Pat. Off. . |
| 53-8317 | 1/1978 | Japan . |

OTHER PUBLICATIONS

Derwent Abstract Accession No. 83–762858/37, Class M25, RO,A, 81–260 (Dobrogea Intr Mini) 28 Feb. 1983 (28.02.83), Abstract.

*Primary Examiner*—Melvyn Andrews
*Attorney, Agent, or Firm*—Merchant, Gould, Smith, Edell, Welter & Schmidt

[57] ABSTRACT

A process suitable for the extraction or recovery of metal values from arsenic containing feeds and including the steps of: a) treating the feed with a nitric acid-containing leachant solution in order to dissolve the desired metals; b) adding a source of iron (III) to the leachant solution whereby to oxidise arsenic (III) in solution to arsenic (V); c) adding a neutralising agent to the leachant solution whereby to precipitate arsenic as arsenic (V); d) separating the arsenic (V) precipitate from the leachant solution; and e) recording metal values from the leachant solution.

18 Claims, 2 Drawing Sheets

EXTRACTION OR RECOVERY OF NON-FERROUS METAL VALUES FROM ARSENIC-CONTAINING MATERIALS

BACKGROUND OF THE INVENTION

The present invention relates to the extraction or recovery of metal values from feed materials and more particularly to the extraction or recovery of metal values from feeds not amenable to efficient extraction by conventional methods.

It is well known that many non-ferrous metal sulphide materials may be dissolved in nitric acid or other acidic solutions containing an oxidizing agent comprising dissolved oxides of nitrogen. A nitric acid-sulphuric acid mixture is one such acidic solution. Examples of such prior art include European Patent Application 87310905.2 (Electrolytic Zinc Company of Australasia Limited). This is typical of the known prior art in that it relates to the oxidative leaching of metal sulphides such as zinc sulphide concentrates.

The known prior art is typically concerned with the treatment of copper- and zinc-containing sulphides. These feeds can be classed as non-refractory being relatively simple feeds to process. However, many feeds particularly those that are the intermediate products of other processes including hydrometallurgical and pyrometallurgical processes are generally considered difficult to treat. With such difficult-to-treat feeds the dissolution of the valuable components may be inhibited, for example, by passivation. Accordingly they are not amenable to extraction or recovery by conventional methods such as direct treatment with aqueous solutions containing nitric acid or sulphuric acid.

Therefore, it has hitherto been considered that in order to achieve acceptable dissolution rates with such feeds, some form of pre-treatment such as roasting is required. Such pre-treatment is costly in terms of both capital costs and operating costs, may cause the dissolution of undesirable components of the feed and may not yield complete dissolution of the desired metals. Alternatively, processing conditions may need to be extremely aggressive to achieve commercially viable rates of reaction.

Processing difficulties are compounded when the feed contains arsenic. Safe disposal of arsenic-containing residues is an important consideration. Many countries have strict mandatory limits on the allowable arsenic levels of wastes from processing operations which are intended to be held in tailings dams or otherwise disposed of.

One conventional method of processing arsenic-containing feeds is by ferric sulphate leaching. During processing of arsenic-containing feeds by ferric sulphate leaching, only a portion of the arsenic (III) is generally oxidized to arsenic (V). The arsenic (III) remains soluble in the aqueous processing media while the arsenic (V) is precipitated as a hydrated ferric arsenate (ideally $FeAsO_4 \cdot xH_2O$). It is known to use an excess of soluble iron in the arsenic precipitation circuit to inhibit the redissolving of arsenic from the ferric arsenate precipitate which is typically disposed of in tailings dams. Typically the Fe/As molar ratio in the precipitate must be at least 4:1. The soluble arsenic (III) which is present in the leach liquor needs to be removed before the metal values can be recovered or excess process water disposed of in an environmentally acceptable manner. Such additional process steps involve the use of additional reagents and can lead to significant increases in both capital and operating costs.

Precipitation of an environmentally stable arsenic-containing product is difficult to achieve with feeds in which the iron content is below that required for the precipitation of an iron arsenate with a Fe/As ratio of 4/1 or above. Previous practice has been to provide sufficient calcium cations to precipitate calcium arsenate for "total" arsenic precipitation. At the same time the pH of the slurry is adjusted to the appropriate range. However, it is known that calcium arsenate is more chemically reactive than ferric arsenate and is not regarded as an acceptable alternative.

More commonly, and as well established by prior art, non-ferrous metal sulphides can be dissolved in acidic sulphate solutions. Such solutions can be formed directly from sulphuric acid, by bacterial regeneration of ferric sulphate solutions, or more commonly by the oxygen pressure leaching technology.

U.S. Pat. Nos. 4,244,732 (Reynolds), 4,244,735 (Reynolds) and 4,331,469 (Kunda), all provide for disposal of arsenic in feed materials as an iron arsenic compound. However, these processes require pressure oxidation to operate in the sulphuric acid environment provided. These prior proposals are accordingly not cost effective and/or do not yield environmentally acceptable arsenic-containing by-products.

SUMMARY OF THE INVENTION

It is accordingly an object of the present invention to provide, in one embodiment, a novel process suitable for the extraction or recovery of metal values from arsenic containing feeds. Such a novel process is preferably cost effective, maximizes metal recovery and yields environmentally acceptable arsenic-containing by-products.

The present invention accordingly provides, in one embodiment, a process suitable for the extraction or recovery of metal values from arsenic-containing feeds and including the steps of:
(a) treating the feed with a nitric acid-containing leachant solution in order to dissolve the desired metals;
(b) adding a source of iron (III) to the leachant solution whereby to oxidize arsenic (III) in solution to arsenic (V);
(c) adding a neutralising agent to the leachant solution whereby to precipitate arsenic as arsenic (V);
(d) separating the arsenic (V) precipitate from the leachant solution; and
(e) recovering metal values ;tom the leachant solution It has been found that the recovery step (e) may be optionally carried out either before or after the solid/liquid separation step (d) to remove the arsenic (V) precipitate.

The leachant solution is preferably nitric acid or an acidic solution containing dissolved oxides of nitrogen as the oxidant. Leachant solutions comprising mixtures such as a nitric acid/sulphuric acid mix are also envisaged within the scope of the invention.

The leaching treatment step (a) may be carried out at ambient temperatures and at atmospheric pressure. However it is preferred if the leaching treatment step (a) is carried out at elevated temperatures. Temperatures in the range of 60°–90° C. are particularly preferred. The dissolution of the feed is generally mildly exothermic and the optimum temperature can be maintained by injection of steam and/or via heat exchangers. The leaching conditions are generally optimized to ensure complete oxidation of arsenic (III) to arsenic (V), while providing reaction conditions that maximize precipitation of arsenic (v) as stable ferric arsenate.

The source of iron (III) may be a salt such as ferric sulphate [$Fe_2(SO_4)_3$] or ferric nitrate [$Fe(NO_3)_3$] or a compound such as pyrite [$FeS_2$] which generates iron (III) in solution in the leachant solution, The source of iron (III) may be added directly to the leachant solution during leaching treatment step (a). In an alternative arrangement also within the scope of the present invention, the source of iron (III) may be added according to step (b) to the leachant solution which comprises the liquid phase obtained from an initial solid/liquid separation step downstream of leaching treatment step This intermediate separation step allows the solid phase to be optionally leached for further extraction of metal values. A further optional suphuric acid leach step is particularly preferred.

The arsenic-iron precipitate is formed by the presence of a source of iron (III) such as ferric nitrate and by the addition of a neutralising agent such as calcium hydroxide. Ferric arsenate precipitation is usually maximized at a pH of about 4–7, ie. slightly acidic. For some feeds, the liquor generated by the leaching treatment step (a) will be considerably more acidic than this.

The iron (III) addition rate should preferably be sufficient to achieve an Fe/As molar ratio of at least 4:1 and preferably about 8:1.

Lime is the commercially preferred neutralising agent in terms of cost and addition of calcium cations for precipitation of both arsenate and sulphate anions.

The neutralising agent may be added to the leachant solution at the same time as the source of iron (III). In one particularly preferred arrangement the source of iron (III) is added to the leachant solution during treatment step (a) and the neutralising agent is added subsequently, most preferably to the liquid phase after an initial solid/liquid separation following leaching treatment step (a).

Preferably the precipitation of ferric arsenate is carried out at elevated temperatures—preferably temperatures in the range of 80°–85° C.

It has been found that the present invention results in the formation of a highly crystalline arsenic containing residue. The residue has high environmental stability and because of its highly crystalline structure the solid/liquid separation processes are improved.

In addition the invention has the advantage of utilizing a leachant solution which results in very short reaction times with the extent of dissolution of desired metal values being maximized without the need for using pressures above a atmospheric pressure.

The present invention is suitable for use as a pretreatment step wherein after removal of the arsenic from the circuit via the arsenic (V) precipitate the leach liquor may e further treated to recover copper and/or other dissolved metals such as zinc, nickel and cobalt.

One particular advantage of the present invention is that it facilitates the extraction of metal values from a wide range of feeds including feeds containing iron compounds which are generally considered as refractory feeds.

The invention is particularly suitable for application to feeds containing zinc, copper, nickel, cobalt and platinum group metals.

BRIEF DESCRIPTION OF THE DRAWINGS

There are a number of flow-sheets which could be developed for each given feed. Examples of two such flow-sheets suitable for treatment of a lead-containing dross according to the present invention are shown in the drawings.

In the drawings.

DETAILED DESCRIPTION OF PREFERRED EMBODIMENTS

Figure 1:
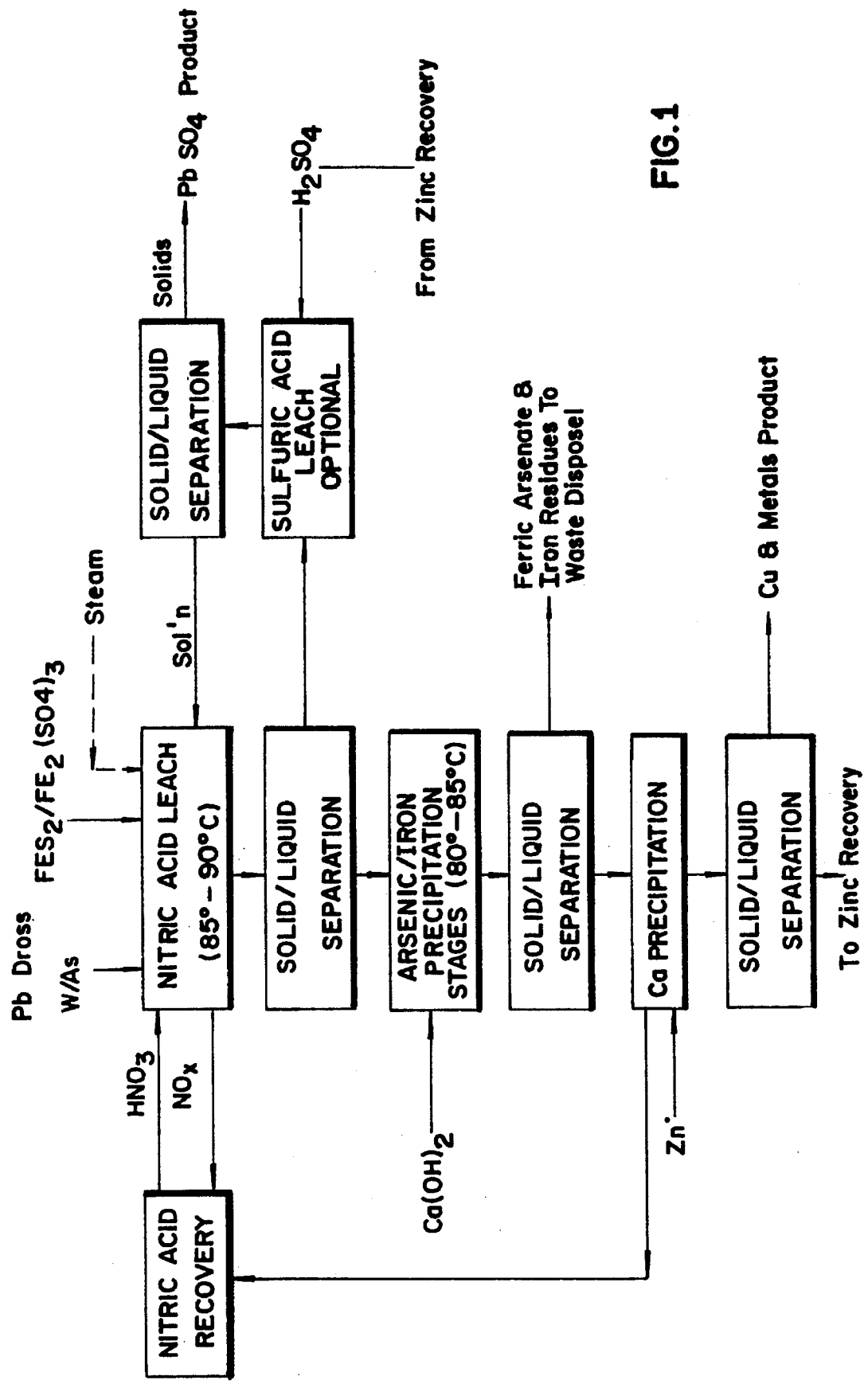
FIG. 1 is a flow-sheet for a Nitrate/Sulphate treatment of a high arsenic lead dross feed.

In the nitrate/sulphate based option shown in FIG. 1 the high arsenic lead dross feed is subjected to a nitric acid leach in the present of pyrite [$FeS_2$] and ferric sulphate [$Fe_2(SO_4)_3$]. In this particular embodiment of the invention the nitric acid leach which comprises treatment step (a) is conducted at atmospheric pressure and at a temperature in the range of 85°–90° C. The temperature is raised by the introduction of steam to the nitric acid leach treatment step. At least a portion of the nitric acid used for leaching can be supplied by the nitric acid recovery stage.

The nitric acid leach treatment step at elevated temperatures generates a variety of nitrogen oxides [NOx] which may be sent to the nitric acid recovery step.

This nitric acid regeneration step may consist of a conventional process using direct oxidation of the NOx gas stream and absorption into an aqueous stream. In an alternative regeneration step not included in FIG. 1 nitric acid can be regenerated by treatment of a solution containing nitrate and chloride anions with sulphuric acid.

After initial leaching the contents of the leach vat are passed to a solid/liquid separation stage at which the solid material which contains the lead values are subject to an optional sulphuric acid leach followed by a further solid/liquid separation. The liquid phase from the separation is recycled to the nitric acid leach vat and the solid phase provides the lead in the form of lead suphate [$PbSO_4$] which may be recovered as metallic lead if required.

The sulphuric acid used for the optional sulphuric acid leach step may be provided at least partly from the zinc recovery stage which is conducted downstream.

The liquid extract from the separation following the nitric acid leach contains the arsenic and iron in solution. By the addition of calcium hydroxide (lime) which raises the pH to the preferred range of pH 4–7, the arsenic is precipitated as ferric arsenate [$FeAsO_4$]. This stage is conducted preferably at a temperature in the region of 80°–85° C. The precipitate is separated in a following solid/liquid separation stage and the ferric arsenate and iron residues are sent to waste disposal.

The liquid phase then passes to a copper recovery stage using for example a combination of solvent extraction and electrowinning. Any zinc in solution can also be recovered by such means. Nitric acid can be recovered from the copper and zinc-depleted liquors.

Figure 2:
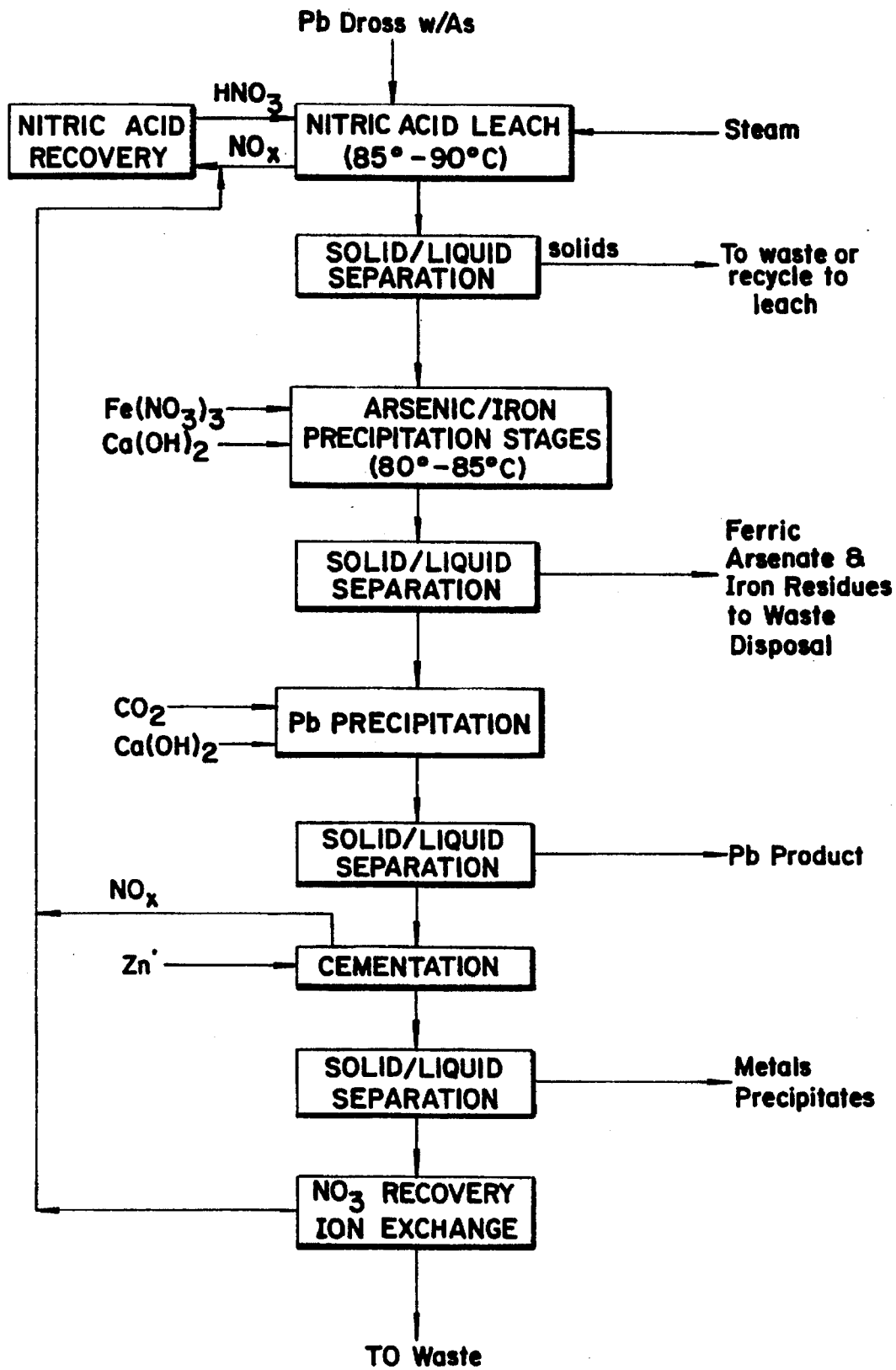
FIG. 2 is an alternative flow-sheet for a Nitrate treatment of a high arsenic lead dross feed.

In the alternative embodiment shown in FIG. 2 the arsenic containing lead dross undergoes nitric acid leach and separation without any optional sulphuric acid leach for removal of lead as lead sulphate.

After the lead dross containing arsenic undergoes nitric acid leach a solid liquid separation takes place and the liquid phase passes to the arsenic/iron precipitation stage where ferric nitrate [$Fe(NO_3)_3$] and calcium hydroxide [$Ca(OH)_2$] are introduced to precipitate ferric arsenate which is removed along with iron residues in the following solid/liquid separation stage and sent to waste disposal. Conditions are similar to those described above in terms of temperature, pressure, pH, Fe/As ratio etc. As will be appreciated by those skilled in the art, it is not practical to nominate specific conditions because each feed will yield process liquors of varying composition. Each feed must be treated on its own merits and optimized accordingly.

The liquid phase from this separation passes to a lead precipitation stage where carbon dioxide and calcium hydroxide ore introduced to precipitate the lead product which is extracted from a further solid/liquid separation stage in known manner.

These two flow-sheets illustrate typical examples of the application of the present invention to a particular feed material.

While it has been convenient to describe the invention herein in relation to particularly preferred embodiments, it is to be appreciated that other constructions and arrangements are also considered as falling within the scope of the invention. Various modifications, alterations, variations and/or additions to the constructions and arrangements described herein are also considered as falling within the scope and ambit of the present invention.

We claim:

1. A process suitable for the extraction or recovery of metal values from arsenic containing feeds having an Fe/As ratio less than 4:1 and including the steps of:
   (a) treating the feed with a nitric acid-containing leachant solution in order to dissolve the desired metals;
   (b) adding a source of iron (III) to the leachant solution to achieve an Fe/As molar ratio of at least 4:1 in the leachant solution whereby to oxidize arsenic (III) in solution to arsenic (V);
   (c) adding sufficient neutralizing agent to the leachant solution to achieve a pH in the range of 4 to 7 in the leachant solution whereby to precipitate arsenic as ferric arsenate;
   (d) separating the ferric arsenate precipitate from the leachant solution; and
   (e) subsequent to step (d), recovering metal values from the leachant solution.

2. A process according to claim 1 wherein the Fe/As molar ratio in step (b) is about 8:1.

3. A process according to claim 1 wherein said leachant solution is nitric acid.

4. A process according to claim 1 wherein said leachant solution comprises an acidic solution containing dissolved oxides of nitrogen as oxidant.

5. A process according to claim 1 wherein leaching treatment step (a) is conducted at elevated temperatures in the range from 60° to 90° C.

6. A process according to claim 1, wherein at least leaching treatment step (a) is conducted at atmospheric pressure.

7. A process according to claim 1 wherein said source of iron (III) comprises ferric sulphate.

8. A process according to claim 1 wherein said source of iron (III) comprises pyrite ($FeS_2$) or a compound which generates iron (III) in said leachant solution.

9. A process according to claim 1 wherein said neutralizing agent comprises calcium hydroxide.

10. A process according to claim 1 wherein ferric arsenate is precipitated at elevated temperatures.

11. A process according to claim 10 wherein said elevated temperatures are in the range from 80° to 85° C.

12. A process according to claim 1 wherein after leaching treatment step (a) an initial separation is undertaken to form a solid phase and a liquid phase.

13. A process according to claim 12 wherein said source of iron (III is added in step (b) to said liquid phase.

14. A process according to claim 12 wherein said neutralizing agent is added in step (c) to said liquid phase.

15. A process according to claim 1 wherein said feed is a high arsenic lead dross feed.

16. A process according to claim 15 wherein prior to precipitation step (c) an initial solid/liquid separation step is conducted in which the solid phase which contains lead values is subjected to a sulphuric acid leach and the liquid phase from said separation undergoes precipitation according to step (c) followed by separation according to step (d) and recovery according to step (e).

17. A process according to claim 1 which further includes a nitric acid regeneration step (f) in which nitrogen oxides generated in step (a) are recovered in the form of nitric acid which is recycled to step (a).

18. A process according to claim 17 wherein nitric acid is regenerated in step (f) by treatment of a solution containing nitrate and chloride anions with sulphuric acid.

* * * * *

UNITED STATES PATENT AND TRADEMARK OFFICE
CERTIFICATE OF CORRECTION

PATENT NO. : 5,482,534

DATED : January 9, 1996

INVENTOR(S) : Rodney L. Leonard et al.

It is certified that error appears in the above-identified patent and that said Letters Patent is hereby corrected as shown below:

Add the following PCT data:

Item [22] should read as follows:

[22] PCT Filed:     Oct. 23, 1992

[86] PCT No.:     PCT/AU92/00570
        371 Date:     Apr. 20, 1994
        102(e) Date:     Apr. 20, 1994
    [87] PCT Pub. No.:     WO93/08310
        PCT Pub. Date:     Apr. 29, 1993

Column 2, line 44, "; tom" should read --from--.
Column 3, line 7, insert --(a).-- after the word "step".
Column 3, line 47, "e" should read --be--.
Column 6, claim 7, line 8, insert --or ferric nitrate-- after the word "sulphate".
Column 6, claim 23, line 23, "(III" should read --(III)--.

Signed and Sealed this

Twenty-eighth Day of May, 1996

Attest:

BRUCE LEHMAN

Attesting Officer     Commissioner of Patents and Trademarks